United States Patent
Maitra et al.

(10) Patent No.: US 11,619,535 B2
(45) Date of Patent: Apr. 4, 2023

(54) SELF-DRAINING SENSOR CAVITY HAVING A REFLECTOR SURFACE WITH A RADIALLY EXTENDING HYDROPHILIC SECTION

(71) Applicant: FT Technologies (UK) Ltd, Sunbury-on-Thames (GB)

(72) Inventors: Tanmoy Maitra, London (GB); Sven Hirons, London (GB)

(73) Assignee: FT Technologies (UK) Ltd, Sunbury-on-Thames (GB)

( * ) Notice: Subject to any disclaimer, the term of this patent is extended or adjusted under 35 U.S.C. 154(b) by 279 days.

(21) Appl. No.: 16/991,998

(22) Filed: Aug. 12, 2020

(65) Prior Publication Data
US 2021/0055148 A1    Feb. 25, 2021

(30) Foreign Application Priority Data

Aug. 13, 2019   (GB) ...................................... 1911583

(51) Int. Cl.
*G01F 1/66*   (2022.01)
*G01F 15/14*   (2006.01)

(52) U.S. Cl.
CPC .............. *G01F 15/14* (2013.01); *G01F 1/662* (2013.01)

(58) Field of Classification Search
None
See application file for complete search history.

(56) References Cited

U.S. PATENT DOCUMENTS

| 7,833,486 | B2 * | 11/2010 | Fielden | F16K 99/0017 422/537 |
| 9,410,873 | B2 * | 8/2016 | Wilson | B01L 3/50273 |
| 2007/0184238 | A1 * | 8/2007 | Hockaday | B32B 27/36 428/98 |
| 2016/0022244 | A1 * | 1/2016 | Courtney | A61B 8/4416 600/407 |
| 2019/0060897 | A1 * | 2/2019 | Makino | G01N 21/64 |
| 2019/0128713 | A1 | 5/2019 | Campbell et al. | |
| 2021/0003534 | A1 * | 1/2021 | Lal | G01N 29/2437 |
| 2021/0247415 | A1 * | 8/2021 | Windolph | G01H 9/008 |

FOREIGN PATENT DOCUMENTS

| CN | 207440120 U | 6/2018 |
| CN | 207832822 U | 9/2018 |
| CN | 208420970 U | 1/2019 |

OTHER PUBLICATIONS

FT Technologies, "FT702LT Series Ultrasonic Heavy Duty Wind Sensor", Aug. 5, 2014, Retrieved from the Internet: <URL: http://fttech.co.uk/uploads/files/1/Resource/A4236-2-EN-Meteorology-Datasheet_Web.pdf>, [retrieved on Nov. 28, 2016], XP055323356, pp. 1-6.

* cited by examiner

*Primary Examiner* — Harshad R Patel
(74) *Attorney, Agent, or Firm* — Sheppard, Mullin, Richter & Hampton LLP

(57) ABSTRACT

A body for an acoustic resonance fluid flow speed sensor or an acoustic resonance fluid flow sensor comprising such a body, the body comprising a reflector surface with at least one section that is more hydrophilic than a surrounding section of the reflector surface to promote movement of water from a centre toward an edge of the reflector surface.

29 Claims, 11 Drawing Sheets

SECTION A-A

BACK VIEW

SECTION A-A

BACK VIEW

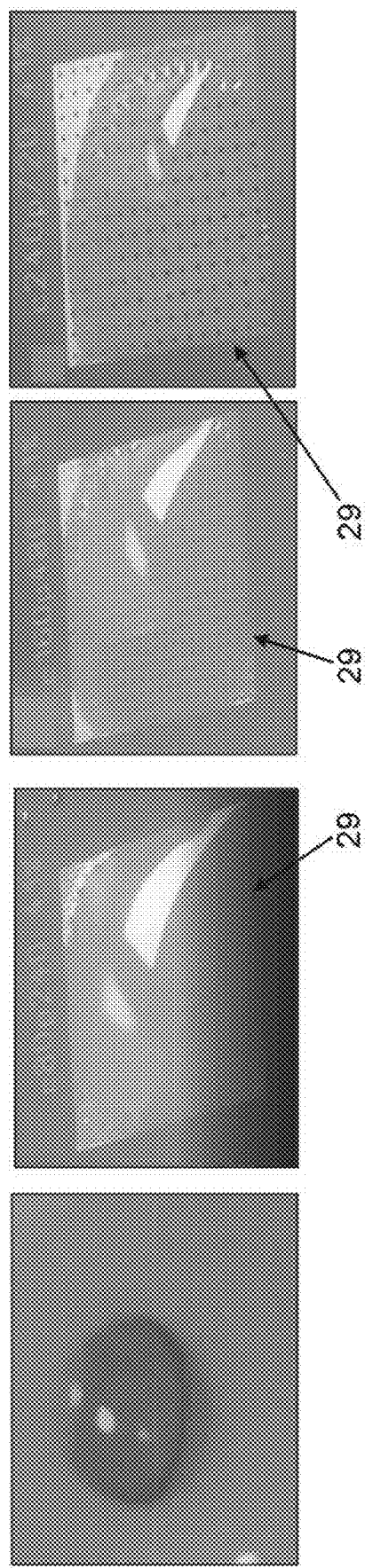

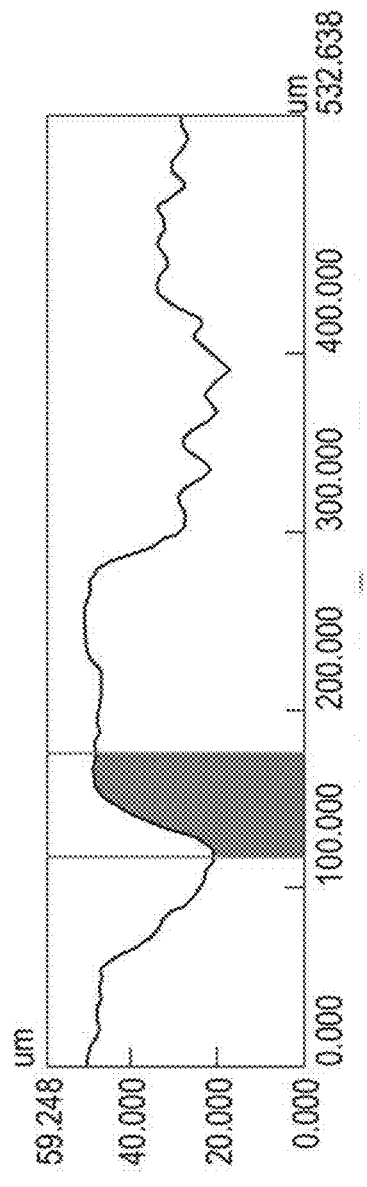
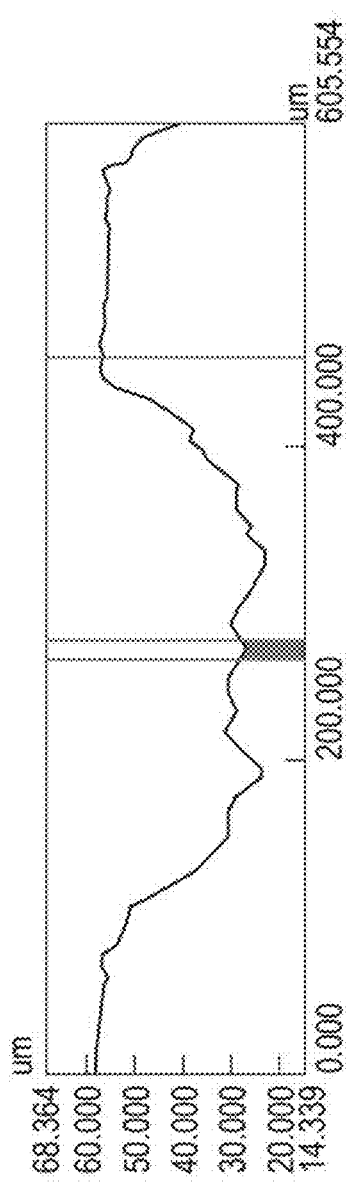
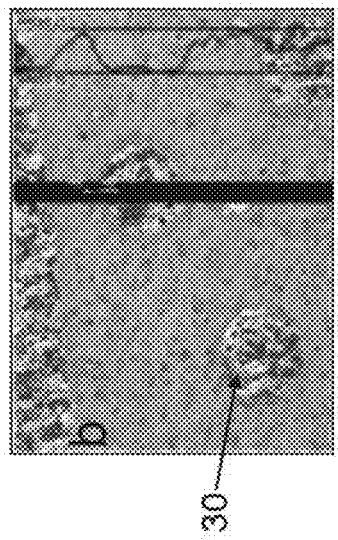
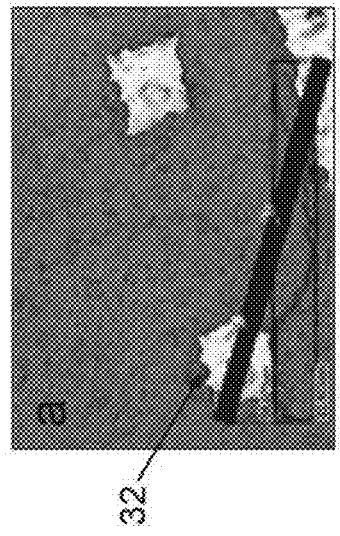
Fig. 10A
Fig. 10B

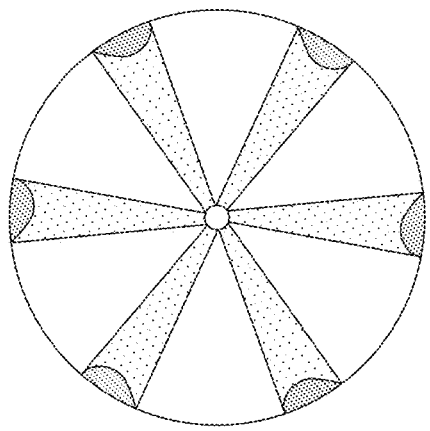
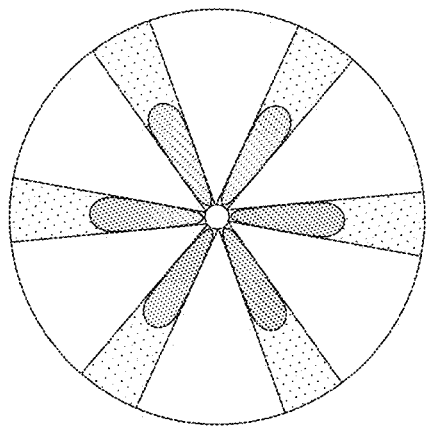
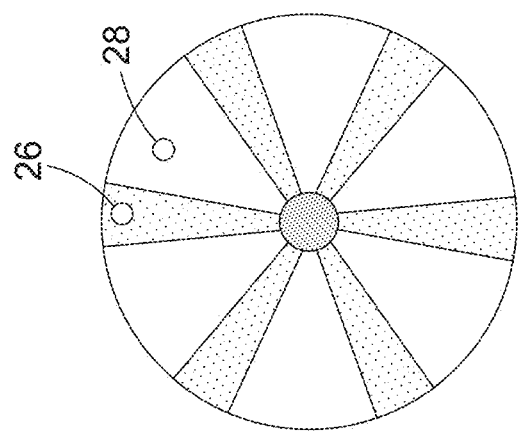
Fig. 13

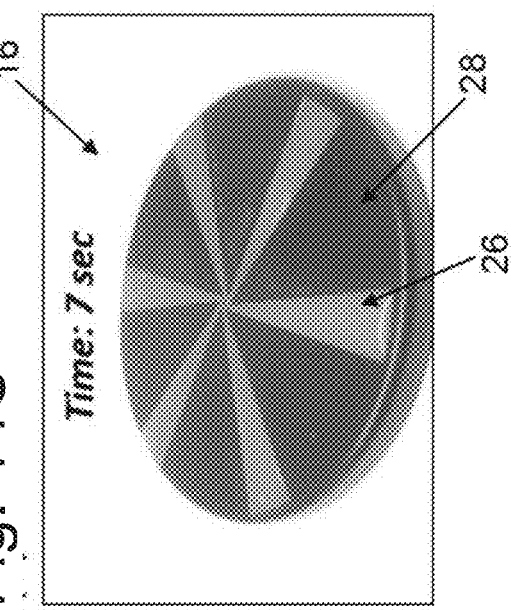
Fig. 14C
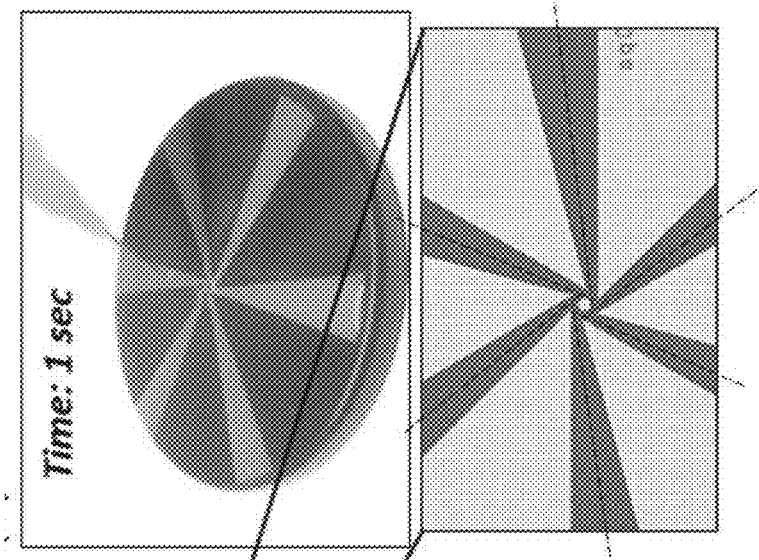
Fig. 14B
Fig. 14D
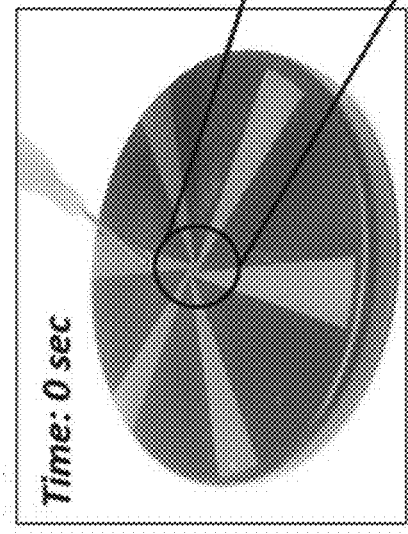
Fig. 14A

SELF-DRAINING SENSOR CAVITY HAVING A REFLECTOR SURFACE WITH A RADIALLY EXTENDING HYDROPHILIC SECTION

CROSS REFERENCE TO RELATED APPLICATIONS

The present application claims priority to Great Britain Patent Application Serial No. 1911583.1, filed Aug. 13, 2019, and entitled "Self-Draining Sensor Cavity," which is incorporated herein by reference.

BACKGROUND

The present disclosure relates to a device for measuring the flow speed of fluid, in particular to a device of the type used in the measurement of the speed and direction of movement of air and other fluids.

Devices for measuring the speed of fluid flow find widespread use, not least in meteorology. Such use exposes the measurement devices to a wide range of environmental conditions that can affect the measurement accuracy achieved by the device. There is a desire to provide a fluid flow measurement device that provides fluid flow speed measurements with improved accuracy despite changes in the environmental conditions in which the device operates.

An acoustic resonance cavity is a device that measures the speed of fluid flowing through the cavity. The cavity is capable of supporting an acoustic standing wave and further comprises at least two acoustic transducers, for generating and detecting the acoustic standing wave.

It is desired to improve the accuracy of measurement of the speed of fluid flow under adverse environmental conditions.

SUMMARY

According to an embodiment there is provided a body for an acoustic resonance fluid flow speed sensor comprising a reflector surface with at least one section that is more hydrophilic than a surrounding section of the reflector surface to promote movement of water from a centre toward an edge of the reflector surface.

The surrounding section may comprise a hydrophobic coating.

The at least one section that is more hydrophilic than a surrounding section of the reflector surface may comprise a fibre arranged on the reflector surface.

The fibre may be capable of wicking liquid using capillary action.

The fibre may comprise a hydrophilic material.

The fibre may be a natural or synthetic fibre or a combination thereof.

The fibre may have a diameter less than 0.2 mm. Alternatively the fibre may have a diameter larger than 0.2 mm.

The least one section that is more hydrophilic than a surrounding section of the reflector surface may comprise a hydrophilic surface.

The hydrophilic surface may be formed using an ablation process.

An ablation process may be used to etch the hydrophobic coating to expose a hydrophilic material forming the at least one section that is more hydrophilic than a surrounding section of the reflector surface.

A width of the at least one section that is more hydrophilic than a surrounding section of the reflector surface may increase in a direction from the centre of the reflector plate towards the edge of the reflector surface.

The at the least one section that is more hydrophilic than a surrounding section of the reflector surface may comprise a series of channels of either constant width, diverging width or a combination thereof.

The at the least one section that is more hydrophilic than a surrounding section of the reflector surface comprises a plurality of roughness features.

The roughness features may be formed on the reflector surface by laser ablation.

The roughness features may comprise a plurality of circular pillars or square pillars or hexagonal pillars or a combination thereof.

The pillars may have different heights.

The device may be coated in a hydrophobic material and the at least one section that is more hydrophilic than a surrounding section may be formed either on top of the hydrophobic section or by selective removal of the hydrophobic coating.

The channels may diverge from the centre of the reflector radially towards an edge of the reflector with an angle of between 5° to 20°.

The channels may diverge from the centre of the reflector radially towards an edge of the reflector with a changing angle.

An acoustic resonance cavity may be formed by two reflector surfaces that are separated by a predetermined distance.

The two reflector surfaces may be spaced apart by spacers having an outer surface that comprises a hydrophilic section.

The outer surface of the body may comprise a hydrophilic section.

According to another aspect of the invention there is provided an acoustic resonance fluid flow speed sensor comprising a body as described above. The device may be a complete acoustic resonance fluid flow speed measurement device. In such a complete device the acoustic resonance cavity is capable of supporting an acoustic standing wave in a direction perpendicular to the direction of the fluid flow. It is nevertheless intended for protection afforded by the claims to extend to a raw body for assembly to form such a device. Such a raw body may, prior to the full assembly of the device, not comprise a fully formed second reflector surface as this second surface may at least in part be formed by the acoustic energy emitting faces of the transducers. The reflector surface already formed on the body nevertheless comprises the at least one section that is more hydrophilic than a surrounding section of the reflector surface to promote movement of water from a centre toward an edge of the reflector surface.

According to another embodiment there is provided a method of providing a surface on a body for an acoustic resonance fluid flow speed sensor, the surface being a reflector surface of the sensor and configured to assist drainage of water from the sensor, the method comprising providing at least one section that is more hydrophilic than a surrounding section of the reflector surface to promote movement of water from a centre toward an edge of the reflector surface.

BRIEF DESCRIPTION OF THE DRAWINGS

Arrangements of the present invention will be understood and appreciated more fully from the following detailed description, made by way of example only and taken in conjunction with drawings, in which:

FIG. 9A to D show surfaces with and without surface features;

FIGS. 10A and B shows a height profile of surface features according to embodiments;

FIG. 13 illustrates the water transportation action on a reflector surface according to an embodiment;

FIG. 14A to D shows the water transportation action on a reflector surface according to an embodiment.

DETAILED DESCRIPTION

Figure 1A:
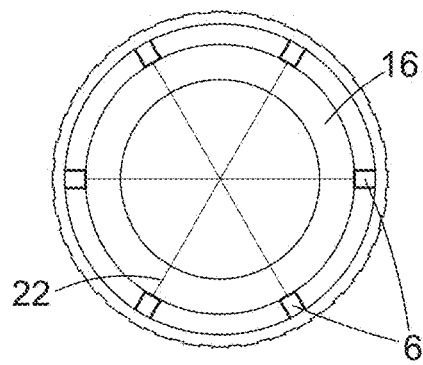
FIG. 1A shows a top section view of an acoustic resonance sensor according to an embodiment.

Fluid flow speed measurement devices such as acoustic resonance anemometers are known from EP 0 801311. In one embodiment, such a fluid flow speed measurement device comprises first and second spaced apart, parallel, circular, planar reflector surfaces 16, 18 and an acoustic transducer arranged in the first reflector surface 16 for transmission of acoustic energy into a cavity 4 that is defined by the spaced apart reflector surfaces 16, 18, as shown in FIG. 1A.

The first reflector 16 and the second reflector 18 define the resonant cavity 4, forming a measurement cavity of the sensor 1, in the space between the first reflector 16 and the second reflector 18. The first and second reflector surfaces 16, 18 are spaced apart such that an acoustic standing wave may form between them in the cavity 4. In use, a fluid such as air, flows through the cavity 4 and the cavity 4 supports an acoustic standing wave in a direction perpendicular to the direction of the fluid flow.

In the embodiments shown in the figures, electroacoustic transducers (not shown) can be housed within a first body part 10 or the second body part 12. The second body part 12 is connected to a supporting rod 14.

In operation, the electro-acoustic transducers generate an acoustic wave. Any one of the transducers receives an electrical signal generated by the electronic unit (not shown) and excites a proportional acoustic signal; by action of the acoustic resonant cavity 4, the acoustic signal is impressed on the other transducers (not shown) which accept the acoustic signal and generate proportional electrical signals which are, in turn, fed back to the electronic unit for processing.

The resonant frequency to support the standing wave is dependent on the speed of sound in the fluid and the separation between the reflectors 16 and 18 (resonator gap), which is an integer multiple of half-wavelengths at the resonance frequency. In propagating from one transducer A to another transducer B the acoustic signal and its derivative electric signal experience a time delay (and equivalent phase shift) which is related to the speed of sound in the fluid medium and the net distance between the transmitting A and receiving B transducers.

In still air, an identical time delay is measured when the direction of signal transmission is reversed i.e. from transducer B to A since (a) the distance travelled by the signal and (b) the sound velocity remains the same whether the signal is transmitted from A to B or vice versa.

If the air moves, on the other hand it proportionally increases the net speed of sound in the direction of movement. Conversely, it proportionally reduces the speed of sound in the direction opposite to the direction of movement. Consequently, the electronic unit which measures the time delay, or equivalently the phase shift, detects a difference in time delay (and phase shift) when reversing the direction of the signal.

The magnitude of the difference in time delay, and equivalent difference in phase shift, is related to the speed of the air along the adjoining line between the pair of transducers. Using a second pair of transducers whose adjoining line lies in some other direction, the velocity in a second direction can be found, from whence the speed and direction of airflow can be calculated using established trigonometric formulae.

As discussed, the resonant frequency of the standing wave is, in dry conditions, dependent on the separation between the reflectors 16 and 18. In adverse weather conditions the resonator cavity 4 can become filled with rainwater. In wet conditions, however, an upper surface of water pooling on reflector surface 16 forms a water-air interface at which at least part of the acoustic energy of the standing wave is reflected. This effectively reduces the spacing of the reflectors that form the resonance cavity 4. As a consequence the frequency of the acoustic standing wave supported by the resonance cavity 4 is altered by the presence of pooled water in the resonance cavity 4.

Moreover, air-water interface formed by pooled water will not remain static and maintain a level surface in adverse weather conditions because air flow in the cavity is likely to constantly disturb the pooled water.

Figure 1B:
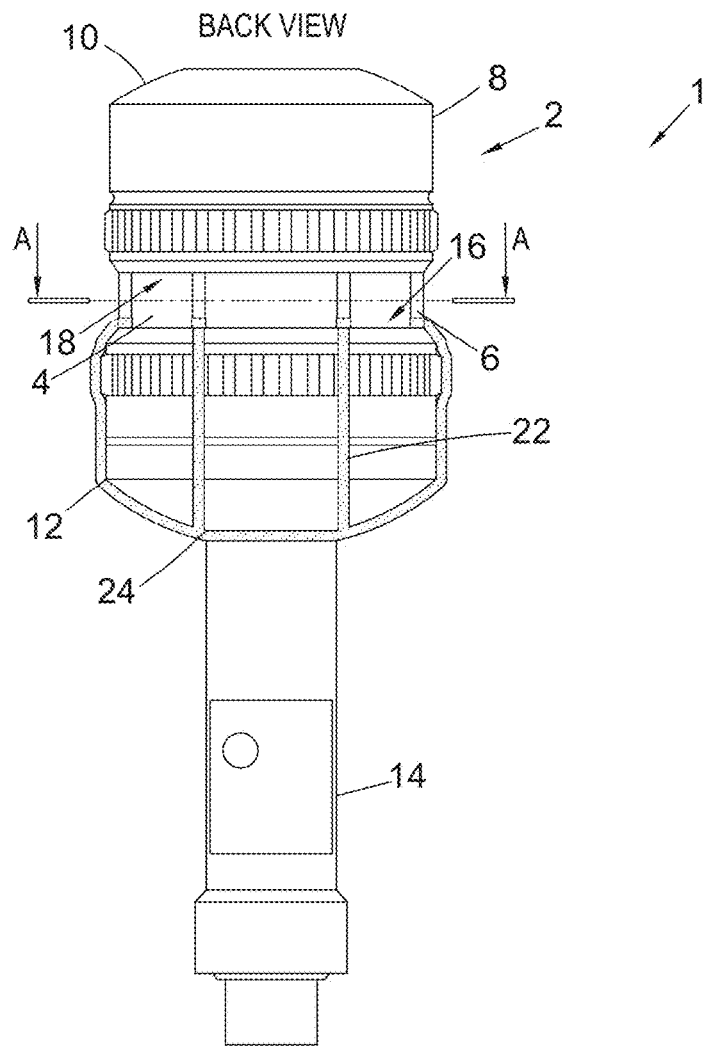
FIG. 1B shows a side elevation of an acoustic resonance sensor according to an embodiment.

Fluid speed measurement devices of the type shown in FIGS. 1A and 1B comprise measurement electronics that track the resonance frequency of the standing acoustic wave within the resonance cavity 4 to accommodate frequency changes resulting from changes in environmental conditions, such as temperature changes. Such electronics can be able to accommodate changes in the resonance frequency of the acoustic standing wave caused by a narrowing of the resonator gap by pooled water. As the air-water interface of such pooled water moves under the influence of air flow the electronics attempts to track the resulting changes in the resonance frequency of the acoustic standing wave. However, under particularly adverse weather conditions the air-water interface may move rapidly, resulting in correspondingly rapid changes in resonance frequency. This can makes tracking difficult and/or inaccurate. Therefore as a result of the environmental conditions, the ability of the sensor 1 to evaluate such an acoustic wave may be negatively affected. It was realised that this problem may be mitigated if the pooling of water in the resonance cavity 4 could be avoided or at least reduced.

It is known to use a homogeneous super hydrophobic coating on the lower reflector 16 to reduce pooling of water in the resonator cavity 4 of the sensor 1. Additionally or alternatively in an embodiment fibres 22 are arranged so that they extend from a centre of the reflector 16 to the edge of the reflector 16 as shown in FIG. 1A. The fibres 22 can wick pooled water from the centre of the reflector 16 to the edge, from where it can run way along the outside of the sensor 1 under the influence of gravity. The fibres 22 therefore provide an alternative method to shed rainwater from the resonance cavity 4.

As shown in FIG. 1A the fibres 22 are optionally positioned around spacers 6. Furthermore, as shown in FIG. 1B the fibre 22 may also extend downwardly along the vertical sidewall of the body 2, specifically on the second body part 12, and be secured in position by an anchor ring 24.

The plurality of spacers 6 are located at intervals around the perimeter of the first reflector 16 and second reflector 18. As shown, the fibres 22 of FIG. 1A may split and extend on either side past individual spacers 6. Alternatively, the fibres 22 may be wrapped around spacers 6 to ensure that the fibres 22 do not move laterally on reflector surface 16.

By arranging fibres 22 in alignment with the spacers 6 the fibres extend downwardly along the body 12 in alignment with the spacers 6. In this manner water flowing downwardly along the spacers is encouraged to continue its downward flow along the fibres 22.

Figure 2:
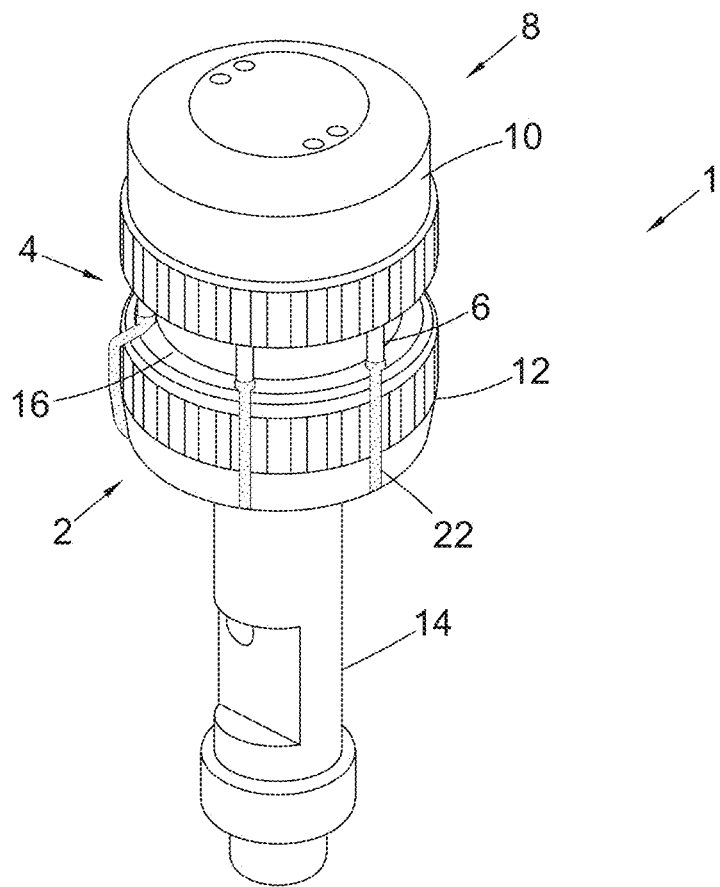
FIG. 2 depicts a perspective view of an acoustic resonance sensor according to an embodiment.
Figure 3:
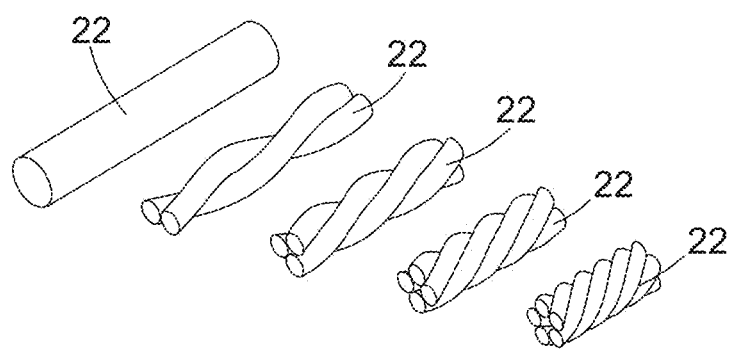
FIG. 3 shows a material in thread form and in various twisted configurations.

The fibre 22 comprises a material which transports water in contact with the fibre 22 using capillary forces. Capillary forces allow the liquid to penetrate into the interstitial spaces within the hydrophilic walls and be displaced through the hydrophilic walls. The interstitial spaces are the spaces within the fibre structure and can include pores or, where the fibre 22 is formed from smaller threads, fibres or non-porous structures, the internal spaces formed when these are wound together. The capillary forces are governed by the properties of the liquid (water in this case), the liquid-medium surface interactions (the level of hydrophilicity), and geometric configurations of the interstitial spaces in the medium (the fibre). The fibre 22 therefore has a degree of hydrophilicity and a sufficiently permeable structure, which encourages liquid to travel in the fibre 22 using capillary forces. The fibre 22 may be a natural fibre (e.g. cotton), synthetic fibre (e.g. polyester), or a combination thereof. The meniscus formed by the fibres 22 in in the interstitial spaces allows the capillary forces to pump the water. The extension of the fibre 22 down to the anchor ring 24, as shown in FIG. 2, facilitates the water pumping action under gravity. The threads that constitute a strand of the fibre 22 are twisted together as shown in FIG. 3 to form a larger fibre—improving the strength of the fibre 22, increasing surface area, promoting water absorption and providing the interstitial space to enhance fluid transfer.

In an embodiment, the effect the fibre 22 has on the aerodynamics and acoustic performance of the sensor 1 is minimised by keeping the outer diameter of fibre 22 to less than 0.2 mm for a resonance cavity with a reflector spacing of between 5 and 10 mm. Alternatively, fibres 22 with larger diameters or braiding further fibres together can offer superior wicking action by providing greater surface are for capillary action and can be used without compromising the sensor 1 performance.

The fibres 22 can be placed radially anywhere on the reflector's surface 16 to pump water from the cavity 4. As shown in FIGS. 1A to 1B however, preferably fibres 22 are wrapped around the sensors' spacers 6 because during rain, water flows from the top to bottom of the sensor 1 via the spacers 6. It was observed that water tends to preferentially accumulate close to the inner face of the spacers 6 compared to other regions of the reflector surface 16.

Figure 4:
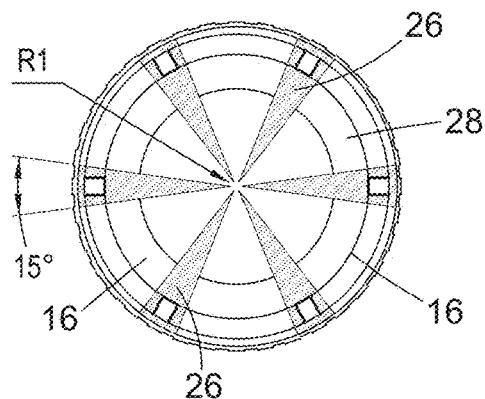
FIG. 4 shows a top section view through the resonance cavity of an acoustic resonance sensor showing a reflector surface of the body patterned with hydrophobic and hydrophilic sections.

FIG. 4 shows an alternative embodiment in which a pattern of hydrophilic and hydrophobic sections have been created on the reflector surface 16. The reflector surface 16 is machined from aluminium and is treated to form a hard-anodized surface. To form the pattern, the sensor body 2, including the reflector surface 16, is coated with a hydrophobic material. The material may be a hydrophobic material such as a polymer or ceramic. In the embodiment selected parts of this hydrophobic coating are etched and/or removed to expose the hard-anodized aluminium surface below. This can for example, be done using a laser texturing or ablation process. The anodized aluminium surface is naturally hydrophilic; thereby the process creates hydrophilic sections 26 on the hydrophobic coated sensor body 2. The hydrophilic sections 26 shown in FIG. 4 are in a diverging triangular channel form to allow the water to move from the inner part of the reflector surface towards the outer part and out of the cavity 4, however other section geometries are also possible.

The use of laser texturing or ablation on the sensor 1 offers two key advantages: scalability and flexibility to create any complex geometrical patterns or shapes to promote the water transport action.

Figure 5:
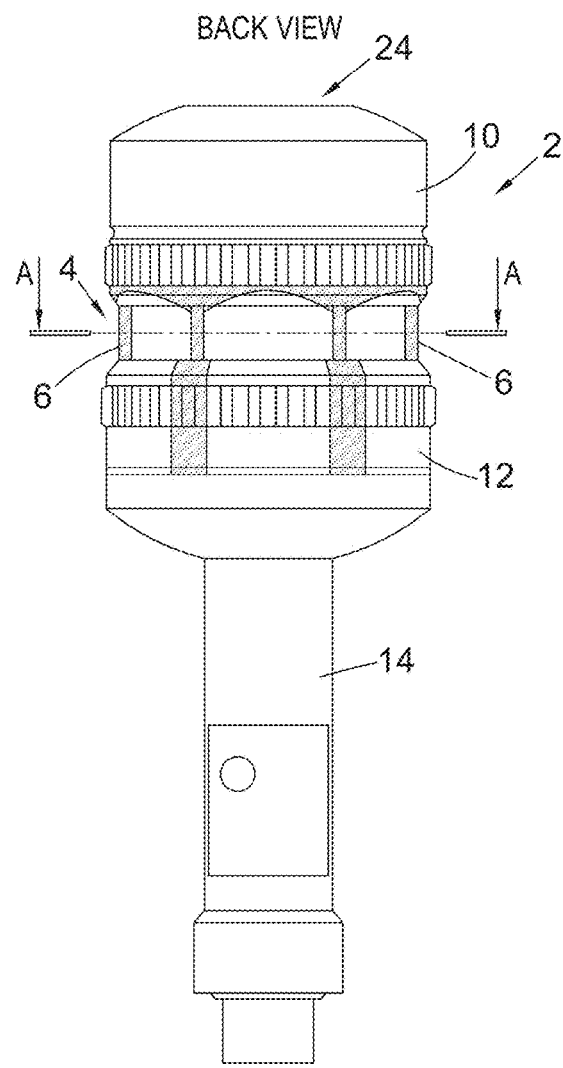
FIG. 5 shows a side elevation of an acoustic resonance sensor showing the body patterned with hydrophobic and hydrophilic sections.

FIG. 5 shows a side elevation of the sensor 1. In the embodiment the outer surface of the spacers 6 and portions of the sidewall of the first and second parts 10, 12 of the sensor body have also been coated and etched. As can be seen from FIG. 5, the patterned part on the upper body part 10 of the sensor extends around the entire circumference of the upper body part 10 in an upper portion of the patterning. Further downwardly towards the spacers 6 the patterned part is no longer circumferentially continuous and instead comprises residual hydrophobic parts located circumferentially between parts of the hydrophilic pattern. The parts of the hydrophilic pattern themselves are gradually circumferentially narrowing with decreasing distance to the spacers 6. The width of the part of the hydrophilic pattern at the point at which the pattern contacts the spacers 6 is substantially the same as the width of the spacers 6. As can be seen from FIG. 5, in an embodiment the spacers themselves are also patterned to increase their hydrophilicity and, in the embodiment areas of the lower body 12 that extend downwardly from the spacers are also patterned in areas extending downwardly from the spacers 6.

The etched parts of the first and second body 10, 12 are such that water travelling under gravity from the top surface 24 of the first body 10, which is the surface furthest from the supporting rod 14, will be channeled towards each spacer 6, down the outer surface of each spacer 6 and subsequently down selectively etched regions on the outer surface of the second body part 12. Thus, the water on the outside of the sensor body 2 follows the hydrophilic path and bypasses the cavity 4.

Figure 6:
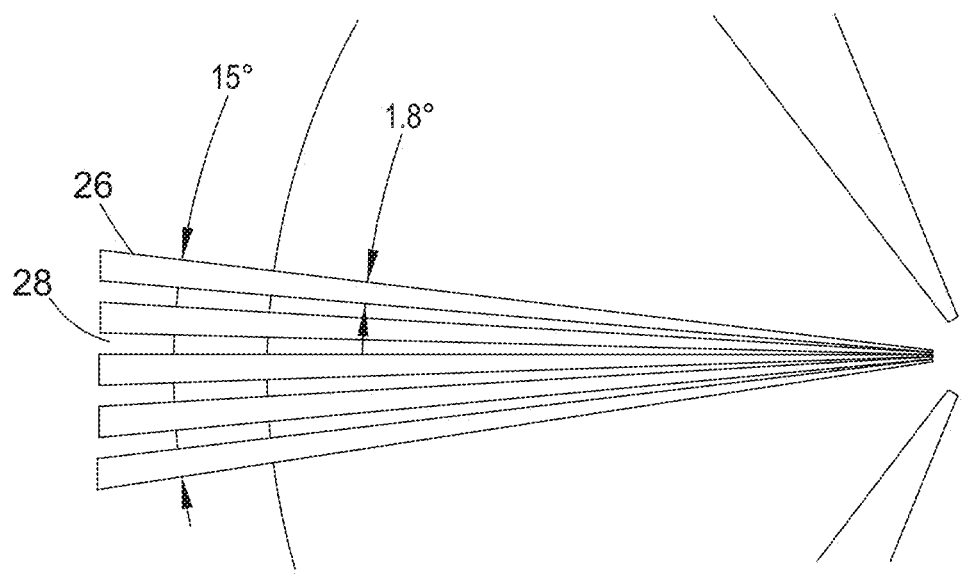
FIG. 6 shows an example of a surface pattern used on a reflector surface of the acoustic resonance sensor body.

Whilst the patterned sections are shown to be triangular in FIG. 5, in an alternative embodiment illustrated in FIG. 6 the patterned sections could also be formed as a series of channels. Patterns of hydrophilic regions in the form of diverging tracks are shown in FIG. 6 and are formed using the same process as described with reference to FIG. 4. In between the channels is hydrophobic material 28. In this example, the diverging hydrophilic channels 26 diverge over a 1.8° sector of the reflector surface 16 and the pattern comprises five such channels 26 diverging radially from the centre of the reflector surface 16 over a 15° sector of the reflector surface 16. There may be a number of such groups of channels on the reflector surface 16.

The use of diverging tracks offer additional driving force for shedding water, by providing a pressure differential from the narrower area to the larger cross-sectional area near the edge of the reflector surface 16. However, as previously shown, in FIGS. 1A-1B, the hydrophilic sections in the form of hydrophilic channels 26 could also have a constant cross-section. The number of hydrophilic channels 26 is not limited to five.

Figures 7A, 7B, 7C:
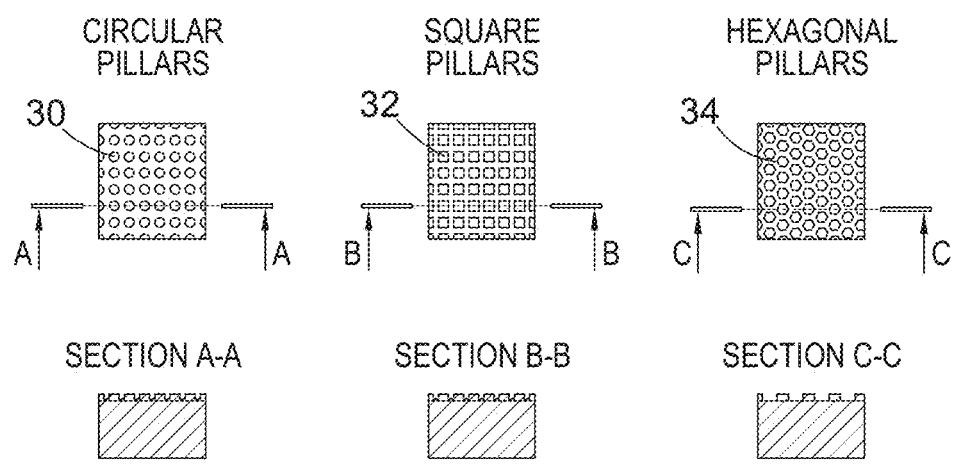
FIG. 7A shows a possible surface pattern geometry using circular pillars in both top and side section view.
FIG. 7B shows a possible surface pattern geometry using square pillars in both top and side section view.
FIG. 7C shows a possible surface pattern geometry using hexagonal pillars in both top and side section view.

Alternatively or in addition, laser ablation can be used to create complex roughness features, as shown in FIGS. 7A-C. The features shown include circular pillars 30 (FIG. 7A), square pillars 32 (FIG. 7B) and hexagonal pillars 34 (FIG. 7C). The pillars are formed on the exposed hard-anodised aluminium surface of the reflector surface 16 to control and enhance the wetting behaviour of the water. The areas of the reflector plate 16 and/or sensor 1 where the complex roughness features are not present may be coated in a hydrophobic coating. The sensor body may be coated with a hydrophobic material which is selectively etched as discussed in relation to FIG. 4 and FIG. 5 to expose the hard-anodized aluminium surface below. This can for example, be done using a laser texturing or ablation process. The etching process may then be applied directly to the expose hard anodised surface wherein the laser selective etches the surface forming, for example, pillars.

The outline of the patterned area comprising the pillars forms a wettability gradient on the reflector surface 16 promoting fluid transport using known biomimetic phenomena wherein natural materials are capable of driving water directionally by controlling the interaction between their nano/micro structured surfaces with water.

As discussed previously, the anodized aluminium surface has an oxide layer making it hydrophilic. Using a laser, or similar etching process, pillars can be formed on the surface which retain the hydrophilic oxide surface on their top surface. Generally, according to the Cassie-Baxter equation, a water droplet on a microstructured surface will sit on the top of the pillars but not wet the spaces between the pillars. This allows air to remain inside microstructured pattern surrounding the pillars, therefore a heterogeneous surface composed of both air and solid is formed.

A result of the textured surface is that adhesive force between the water and the solid parts of the surface is lower than an adhesive force between water and a continuous solid surface would be. This is because the water has less surface to adhere to, allowing the water to roll off easily. The hydrophilic top surface of the pillars means water preferentially builds up on this area and, as more water arrives, the water droplet formed on these areas grow larger over time. Once the weight of the trapped water droplets exceeds the water adhesion force of the surface, the water droplet will roll off, and this process then repeats itself. The result is a "self-cleaning" surface.

The textured surface comprising the pillars on the reflector surface 16 forms channels of constant width or cover a triangular section diverging from the centre of the reflector surface 16 towards the outer part as shown in FIG. 4 or FIG. 6. However, the disclosure is not limited to these arrangements and other pillar patterns, which achieve the same effect, are also envisaged. By using triangular diverging tracks of pillars like those shown in FIG. 4 or FIG. 6, it is possible for the water to move toward the wider part of the triangular pattern. This can be achieved by coating the reflector surface 16 such that the triangular diverging tracks comprising hydrophilic pillars of anodized aluminium are surrounded by a hydrophobic surface i.e. the hydrophobic material. A water droplet may form at a narrow part of the triangular track where gravity and adhesive forces are balanced. As the water droplet preferentially forms on the hydrophilic part of the patterned surface area, the droplet grows in size and its centre of mass moves toward the wider area of the patterned surface. The movement of the droplet is driven by the combination of surface tension of the droplet alongside the width of the area available to the growing droplet overcoming the pinning forces acting on the droplet.

As discussed the pillars may be circular pillars 30, square pillars 32 and hexagonal pillars 34. This said, many different pillar geometries are possible, limited only by the capabilities of the manufacturing process employed in forming the pillars. The invention is not limited to use of the mentioned pillar shapes. Without wishing to be bound by theory, the effect of the small-scale features on wetting behaviour can be explained by Cassie-Baxter theory (Cassie and Baxter 1944) which explains that the water contact angle on a textured surface can be written as:

$$\cos \theta_\alpha = f_1 \cos \theta_1 + f_2 \cos \theta_2 \quad (1)$$

$\theta_\alpha$, $\theta_1$ and $\theta_2$ are the apparent contact angles on the heterogeneous surface, intrinsic contact angles on surface 1 and 2, respectively. f1 and f2 denote solid fractions of surface 1 and 2, respectively. In the examples shown in FIG. 6, surface 1 and 2 are the hard anodized aluminium surface and air respectively, and $f_1+f_2=1$. For complete wetting of a surface, $\theta_2=0$. Therefore, the Cassie-Baxter equation 1 becomes:

$$\cos \theta_\alpha = 1 - f_1(1 - \cos \theta_1) \quad (2)$$

$f_1$ can be calculated from the geometry of the micro-scale roughness features. Based on the geometries shown in FIGS. 7A-C, $f_1$ can be written as $$\frac{\pi d^2}{4P^2}$$

for circular pillars 30 (FIG. 7A)

$$\frac{a^2}{P^2}$$

for square pillars 32 (FIG. 7B)

$$\frac{(a^2 - (a-t)^2)}{a^2}$$

for hexagonal pillars 34 (FIG. 7C)

For circular pillars, d and P denote diameter and centre-to-centre distance between features. For square pillars a and P denote side and centre-to-centre distance between squares and for the hexagonal assembly, a and t denote side and thickness of the hexagon.

The above geometric features are governed by the achievable feature size by the laser system, but other geometries may be possible using other methods, for example 3D printing. Typically, industrial laser systems can provide feature sizes down to 40 μm, with a resolution approximately 80 μm. Using these constraints (d=40, p=80, a=40, p=80, and a=80, t=40 μm) in the Cassie-Baxter equation, $f_1$ is 0.196, 0.25 and 0.75 for textures the circular pillars, square pillars and hexagonal pillars respectively. Thus using knowledge of typical contact angle of water on an alumina surface, ~50° (Bubois, Fournee, Thiel and Belin-Ferre 2008 and Moore, Ferraro, Yue and Estes 2007), $\theta_\alpha$ can be theoretically estimated for the textured hard anodized surface as 11°, 24° and 40°. Therefore the pattern of anodized aluminium pillars provide a significantly lower water contact angle than a hydrophobic material (>90°).

The benefit of texturing the surface is that the structures promote the movement of the droplet off the surface, the water is forced to move along defined trajectories as a consequence of the selected surface chemistry and structures without the need to apply any external energy.

The reflector surface 16 shown in FIG. 4 comprises a hard-anodised surface coated with a commercially available polymer 28. The coating 28 is hydrophobic having a water contact angle of approximately 100° and roll-off angle of approximately 15°. Surface features 29 are created using laser ablation on the surface 16. As discussed, it will be understood that other suitable means for creating the surface features, such as other etching techniques, are also encompassed by the present disclosure. In an embodiment the laser ablation process comprises two steps: in the first step, the hydrophobic polymer 28 is selectively removed exposing the sections of underlying hard-anodized surface. Laser ablation is applied selectively to the coated surface 16 to create diverging tracks 26 as shown in FIG. 4. In the second step, the hard-anodised surface is selectively patterned to create surface roughness features 29, such as cylindrical or square pillars. The surface features 29 are created on the sections of hard-anodized surface, enhancing the hydrophilicity of these areas. It will be understood that the terms diverging channels and diverging tracks are used interchangeably throughout this disclosure.

Figure 8C:
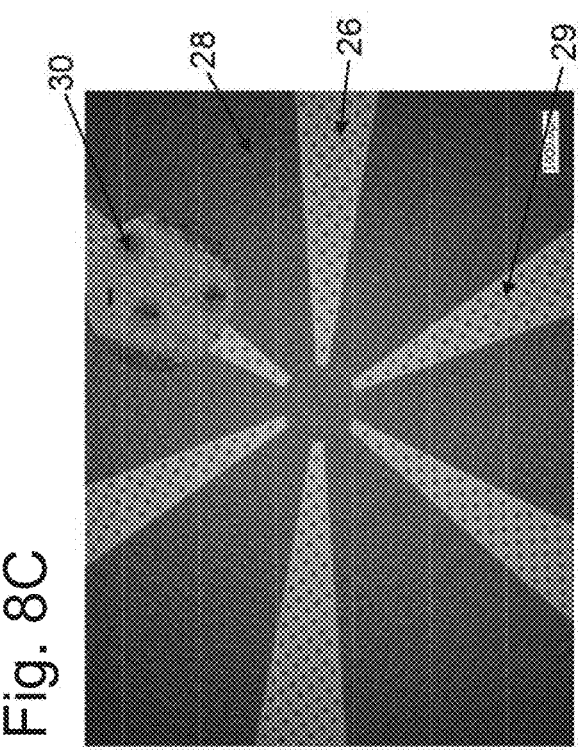
FIG. 8A to D show reflector surfaces having surface patterns according to embodiments.
Figure 8D:
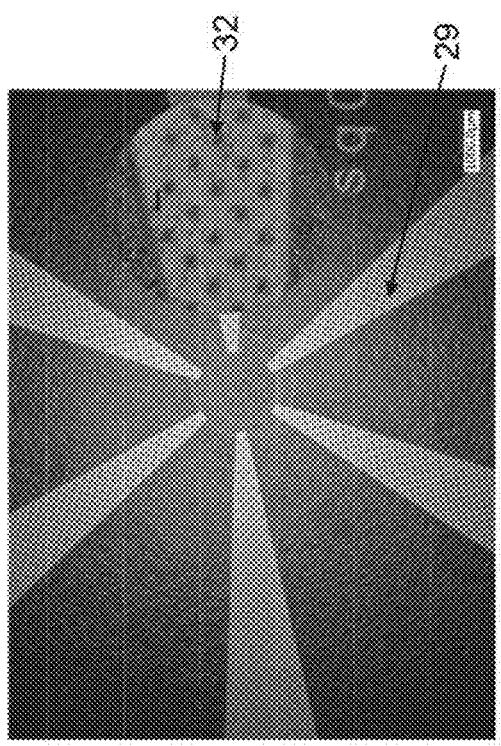
Figure 8A:
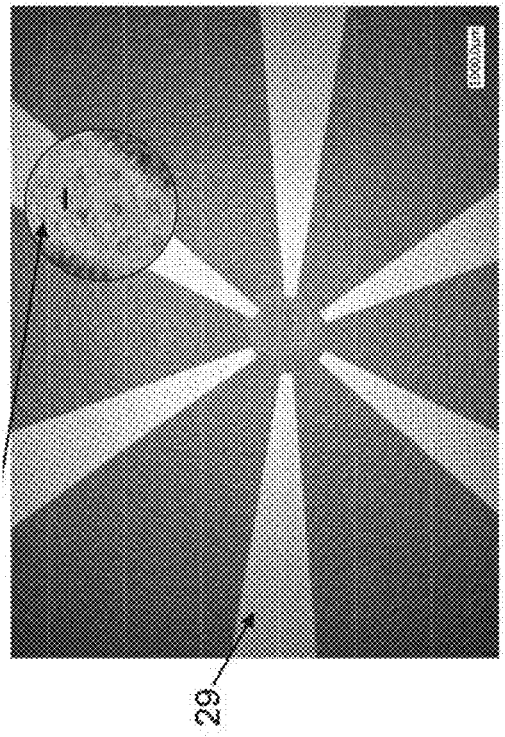
Figure 8B:
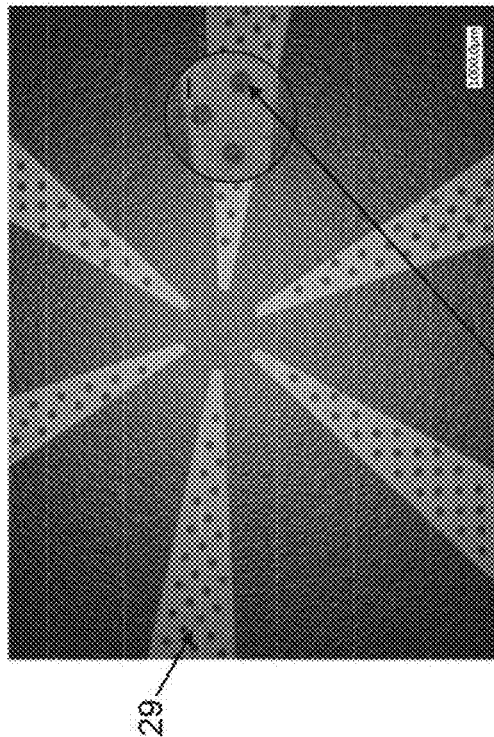

FIG. 8A shows hydrophobic polymer coated hard anodized reflector surfaces 16 with hydrophilic sections comprising diverging channels 26 having surface features 29. The circular inset in FIG. 8A shows a magnified image of the surface features 29 which are cylindrical pillars 30 with feature size of 80 μm and feature pitch 240 μm, the scale bar in the inset is 100 μm. Throughout this disclosure the "feature pitch" means, P, the centre to centre distance between adjacent surface features. The inset of FIG. 8B shows the magnified image of surface features 29 inside the hydrophilic diverging channels 26 comprising cylindrical pillars 30 with feature size of 160 μm and feature pitch 480 μm, the scale bar is 100 μm. The inset of FIG. 8C shows the magnified image of surface features inside the hydrophilic diverging channels 26 comprising cylindrical pillars 30 with feature size of 240 μm and feature pitch 720 μm, scale bar 200 μm. The inset of FIG. 8D shows the magnified image of surface features 29 inside the hydrophilic diverging channels 26 comprising square pillars 32 with feature size of 80 μm and feature pitch 240 μm, the scale bar of the inset 200 μm. In an embodiment the diverging channels 26 do not meet in the centre of the reflector plate 16 as shown in FIGS. 8A-D.

FIG. 9A-D demonstrates the wetting behaviour of the hard-anodized surface, with and without surface features 29, on a water droplet. Without the surface features 29 the bare hard anodized surface is weakly hydrophilic, having a contact angle of approximately 45°, causing water droplets to remain in the location at which they have been deposited, as shown in FIG. 9A. The surface shown in FIG. 9B-D have surface features 29 etched on the hard-anodized surface. FIG. 9B comprises cylindrical pillars with a feature size and a feature pitch of 80 μm and 240 μm, FIG. 9C has features size of 160 μm and feature pitch of 480 μm and FIG. 9D has a feature size of 240 μm and feature pitch of 720 μm. The contact angles on all surfaces of FIGS. 9B, C and D are less than 10°. The effect of surface texturing on wetting is evident from FIG. 9B-D, where the water droplets spreads on the surfaces.

FIGS. 10A and 10B shows laser microscopic images of the height profiles of laser ablated hard anodised surfaces and illustrates that the laser ablation process performed on hard-anodized layer does not sacrifice its integrity. FIG. 10A shows an embodiment in which square pillars 32 are retained after the ablation process. FIG. 10B shows an embodiment in which cylindrical pillars 30 are retained after the ablation process. The graphs provided in FIGS. 10A and 10B show respective height profiles measured along the respective straight line shown in the top plan microscopic image of the ablated hard anodised surfaces. As can be seen from the height profiles of both FIGS. 10A and 10B, that the hard-anodized layer is still present in the regions between the surface features. There, the height of the layer is approximately 15-20 μm. The height of the hard-anodized layer of the surface features/the entire layer prior to patterning is approximately 30 μm. Thus, the reflector surface retains the hard-anodized coating even with the etching of the surface features 29, and is therefore suitable for use in extreme environments.

As shown in FIG. 4, the hydrophilic channels 26 diverge over a 15° sector of the reflector surface 16 (i.e. the sector angle Ψ=15°) and there are six such channels 26 diverging radially from the centre of the reflector surface 16. Separating the diverging channels there are 45° sectors of hydrophobic material 28 on the reflector surface 16. The surface features within the hydrophilic channels 26 can comprise any suitable geometry. Although the diverging channels 26 shown have an angle of 15°, it will be understood that any suitable diverging angle Ψ is intended. In particular diverging channels which diverge at an angle Ψ of 5°-20° are intended but other channel divergence angles may also be used.

Figure 11B:
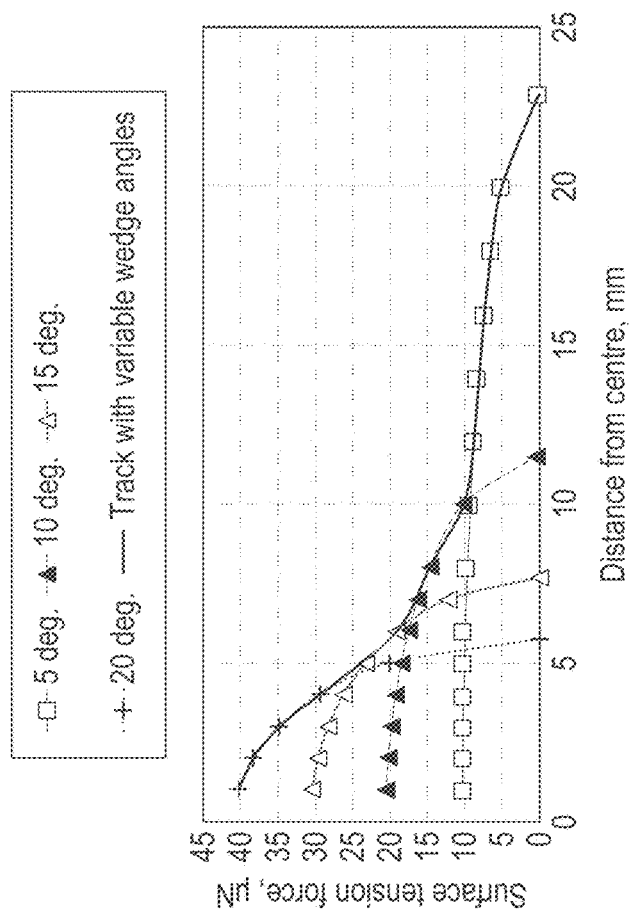
FIG. 11B shows a graph illustrating the surface tension force for various embodiments.
Figure 11A:
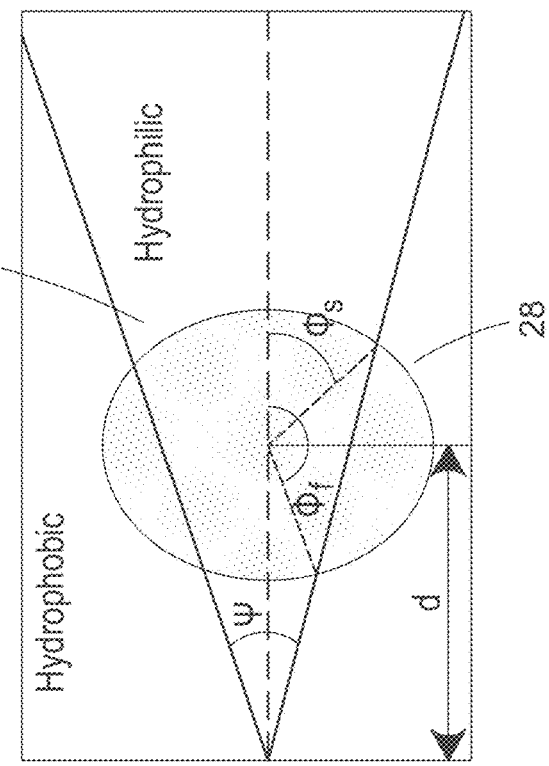
FIG. 11A shows a hydrophilic channel according to an embodiment.

The angle at which the channels 26 diverge affects the surface tension force which acts on a water droplet and subsequently drives it towards the edge of the reflector surface 16. As shown in FIG. 11A the hydrophilic channel diverges with an angle from the centre of the reflector surface 16 toward the edge of the surface. The centre of the droplet shown is at a distance d from the left vertex of the hydrophilic channel 26. The droplet contact line contacts hydrophobic/hydrophilic boundary twice: the first contact point makes an angle, $\Phi_p$, with the centre line of the hydrophilic channel 26, second contact point makes an angle, $\Phi_s$, with the centre line of the hydrophilic channel 26.

As the contact angle changes at the boundary between the hydrophilic channel 26 and the hydrophobic sector 28 surface, the net surface tension force, F, that acts on the water droplet can be estimated from the equation below:

$$F = 2\gamma R(\cos\theta_p - \cos\theta_l)(\sin\varphi_f - \sin\varphi_s) \quad (3)$$

$\theta_p$ and $\theta_l$ are water contact angles on the hydrophobic polymer coated surface 28 and hydrophilic laser textured surfaces 26, respectively. γ is the surface tension and R is the radius of the water droplet. With the knowledge of γ (which is a constant for water of 0.072 N/m), the above equation is used to estimate surface tension force to transport a 2 mm size water droplet along the hydrophilic channel 26. FIG. 11B depicts a plot of the net surface tension force (F) as a function of the distance from the left vertex of the hydrophilic channel.

As can be observed in FIG. 11B, F diminishes as the distance between the droplet and the centre of the reflector surface 16 increases. F also decreases for hydrophilic channels with a decrease in the value of Ψ. Thus, as the droplet moves more toward the edge of the reflector surface 16, the net surface tension force from the hydrophobic/hydrophilic boundary decreases.

The diverging channel 26 with higher Ψ (i.e. wider tracks) have a high net surface tension force nearer the centre of the reflector surface which quickly decays as the droplet travels along the hydrophilic channel 26 toward the edge of the reflector 16. A diverging channel 26 with lower (i.e. narrower tracks) offer a lower net surface tension force, and therefore droplet takes longer to travel from the centre of the reflector surface 16 towards the edge in FIG. 11A.

Figure 12:
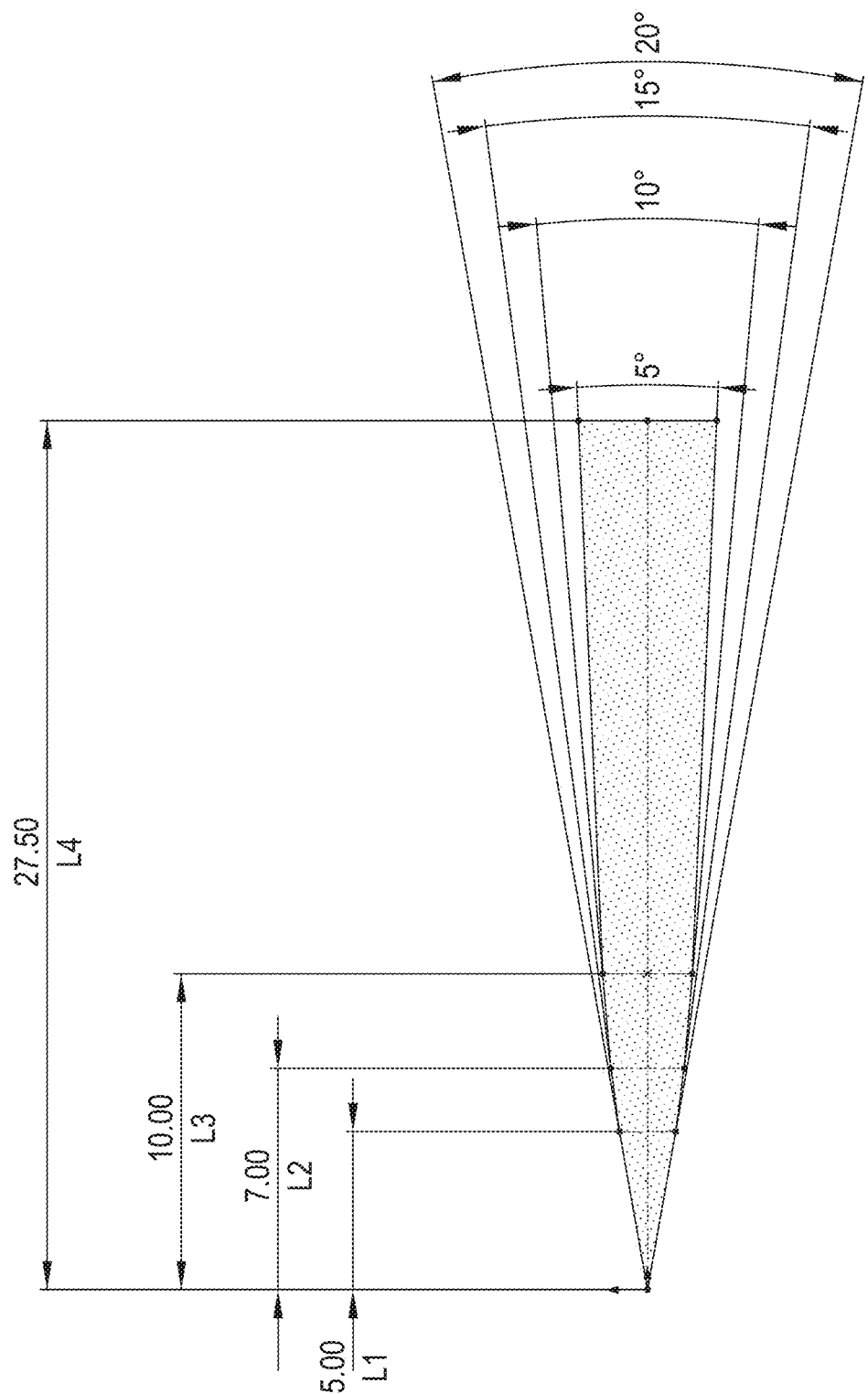
FIG. 12 illustrates a hydrophilic channel according to an embodiment.

In an embodiment shown, FIG. 12 the hydrophilic channels comprise a varying diverging angle Ψ. The hydrophilic channel starts with a Ψ=20° then gradually the angle Ψ changes to 15°, 10° and 5°. This geometry maximizes the surface tension force on 2 mm size water droplet travelling along hydrophilic/hydrophobic boundary. The approximate surface tension force of the hydrophilic channel with variable Ψ are shown in FIG. 11B.

Depending on the requirements of the application wider hydrophilic channels 26 are used to offer higher surface tension force to transport water from the centre to periphery of the reflector surface 16. However, some embodiments use narrower diverging channels so that less of the reflector surface 16 requires ablation by the laser, thereby minimising laser processing time. Furthermore, in some embodiments it is desirable to minimise the area which is hydrophilic as the hydrophilic surface is more likely to become contaminated when compared to the hydrophobic area.

FIG. 13 illustrates the water transportation action occurring in FIGS. 14A to 14D. Following deposition of droplet onto the reflector surface 16, the droplet forms a 'tadpole' shaped water meniscus toward the edge of the reflector surface 16. As surface tension force varies from the centre to the periphery along hydrophilic channel 26 (with higher values at the centre relative to the periphery) based on the equation shown above, the water meniscus does not have a uniform shape in the hydrophilic channels 26. The droplet adopts a spherical shape nearer the centre and a cone shaped meniscus at the periphery, forming a generally 'tadpole' shape as shown. Finally, water accumulates at the edges of the reflector surface 16. The embodiment shown transports a drop, having the volume of a typical raindrop, from the centre to the periphery of the reflector surface 16 within 10 seconds.

FIGS. 14A to 14D illustrates an alternative way of arranging diverging hydrophilic channel 26 on a reflector surface 16. Whilst in the preceding description the respective axes of symmetry of the diverging channels 26 meet in a single point in the centre of the disc. In FIGS. 14A to 14D, in contrast, the axes of symmetry of the different diverging hydrophilic channels 26 do not meet in a single point in the centre of the disc. Instead, one or more or all of the lines of symmetry (as shown by the dashed lines in FIG. 14D) intersect each other in a manner so that they define a polygon surrounding a point at the centre of the disc. The number of vertices of the polygon corresponds to the number of diverging channels 26 on the disc.

As can be observed in FIGS. 14A to 14D, the positioning of the diverging channels 26 also enhances the water transport efficiency. In an embodiment, the diverging channels 26 meet at the centre portion of the reflector surface. In this configuration, the water droplet is transported radially within 7 seconds of deposition, as observed at the time scales shown in FIGS. 14A, B and C. The water transportation in this embodiment is aided by an additional surface tension driving force created by the small hydrophobic island in the centre of the reflector surface 16. As will be appreciated, although six diverging channels 26 are shown, the number of channels is not limited and that more or less diverging channels 26 are also intended.

Whilst FIGS. 14A to 14D shows a particular arrangement in which the diverging channels meet at or close to the centre of the disc it will be appreciated that other arrangements in which the diverging channels meet at or around the centre of the disc are also envisaged.

As discussed above, the water accumulates at the edge of the reflector surface 16. Thus, it is beneficial for the accumulated water to be removed. Hydrophilic sections on the outer surface of the sensor body 1 pumps the water away from the cavity 4. In an embodiment other external forces, such as gravity, aid the removal of the accumulated water at the edge of the reflector plate 15. For example, in an embodiment a bevel at the edge of the reflector surface 16 is provided to allow the water be exposed to gravity. In an embodiment the bevel angle is approximately 45° to the reflector surface 16.

In one embodiment, the transducers of the sensor 1 are provided within the upper body part 10 of the sensor. The upper body part 10 of the sensor is consequently hollow to allow accommodating the transducers. Following the manufacture of the body of the sensor and prior to installation of the transducers, the surface of lower reflector 16 is not only accessible from the sides of the sensor 1 through the spaces defined by the spacers 6 but also through the hollow upper body part 10. The surface of reflector 16 may be patterned prior to the insertion of the transducers into the body and it is intended that a sensor body comprising a lower reflector surface arranged in any of the ways discussed above but excluding transducers and/or any further electronic components also falls within the scope of protection afforded by the claims.

The present invention has been described above purely by way of example. Modifications in detail may be made to the present invention within the scope of the claims as appended hereto. Furthermore, it will be understood that the invention is in no way to be limited to the combination of features shown in the examples described herein. Features disclosed in relation to one example can be combined with features disclosed in relation to a further example.

The invention claimed is:

1. A body for an acoustic resonance fluid flow speed sensor comprising a reflector surface with at least one section which extends radially from a centre of the reflector surface to an edge of the reflector surface,
   wherein the at least one section is more hydrophilic than a surrounding section of the reflector surface which extends to an edge of the reflector surface, providing movement of water in a radial direction via the more hydrophilic section from the centre to the edge of the reflector surface.

2. The body of claim 1, wherein the surrounding section comprises a hydrophobic coating.

3. The body of claim 2, wherein an ablation process is used to etch the hydrophobic coating to expose a hydrophilic material forming the at least one section that is more hydrophilic than a surrounding section of the reflector surface.

4. The body of claim 1, wherein the least one section that is more hydrophilic than a surrounding section of the reflector surface comprises a hydrophilic surface.

5. The body of claim 4, wherein the hydrophilic surface is formed using an ablation process.

6. The body of claim 1, wherein the at least one section that is more hydrophilic than a surrounding section of the reflector surface comprises a fibre arranged on the reflector surface.

7. The body of claim 6, wherein the fibre is capable of wicking liquid using capillary action.

8. The body of claim 6, wherein the fibre comprises a hydrophilic material.

9. The body of claim 6, wherein the fibre is a natural or synthetic fibre or a combination thereof.

10. The body of claim 6, wherein the fibre has a diameter less than 0.2 mm.

11. The body of claim 1, wherein a width of the at least one section that is more hydrophilic than a surrounding section of the reflector surface increases in a direction from the centre of the reflector plate towards the edge of the reflector surface.

12. The body of claim 1, wherein the at least one section that is more hydrophilic than a surrounding section of the reflector surface comprises a series of channels of either constant width, diverging width or a combination thereof.

13. The body of claim 12, wherein the channels extend radially from the centre of the reflector surface, and wherein the channels overlap each other at the centre portion of the reflector surface.

14. The body of claim 13, wherein the channels diverge from the centre of the reflector surface radially towards an edge of the reflector surface.

15. The body of claim 13, wherein the channels diverge from the centre of the reflector surface radially towards an edge of the reflector surface with an angle of between 5° to 20°.

16. The body of claim 13 wherein the channels diverge from the centre of the reflector surface radially towards an edge of the reflector surface with a changing angle.

17. The body of claim 13, wherein each channel has an axis of symmetry and wherein the axes of symmetry intersect each other and define a polygon surrounding the centre of the reflector surface.

18. The body of claim 1, wherein the at the least one section that is more hydrophilic than a surrounding section of the reflector surface comprises a plurality of roughness features.

19. The body of claim 18, wherein the roughness features are formed on the reflector surface by laser ablation.

20. The body of claim 18, wherein the roughness features comprise a plurality of circular pillars or square pillars or hexagonal pillars or a combination thereof.

21. The body of claim 20, wherein the pillars have different heights.

22. The body of claim 1, wherein the reflector surface is coated in a hydrophobic material and the at least one section that is more hydrophilic than a surrounding section is formed either on top of the hydrophobic section or by selective removal of the hydrophobic coating.

23. The body of claim 1, wherein an acoustic resonance cavity is formed by two reflector surfaces that are separated by a predetermined distance.

24. The body of claim 23, wherein the two reflector surfaces are spaced apart by spacers having an outer surface that comprises a hydrophilic section.

25. An acoustic resonance fluid flow speed sensor comprising a body as described in claim 1.

26. A method of providing a surface on a body for an acoustic resonance fluid flow speed sensor, the surface being a reflector surface of the sensor and configured to assist drainage of water from the sensor, the method comprising providing at least one section which extends radially from a centre of the reflector surface to an edge of the reflector surface, where the at least one section is more hydrophilic than a surrounding section of the reflector surface providing movement of water in a radial direction via the more hydrophilic section from the centre to the edge of the reflector surface.

27. The method of claim 26, wherein the hydrophilic section is formed using an ablation process.

28. The method of claim 26, wherein an ablation process is used to etch the hydrophobic coating to expose a hydrophilic material forming the at least one section that is more hydrophilic than the surrounding section of the reflector surface.

29. The method of claim 26, wherein the at least one section that is more hydrophilic than the surrounding section comprises a plurality of roughness features that are formed on the reflector surface by laser ablation.

* * * * *